(12) United States Patent
Shimokawa et al.

(10) Patent No.: US 9,984,715 B2
(45) Date of Patent: May 29, 2018

(54) MAGNETIC DISK AND MANUFACTURING METHOD THEREOF

(71) Applicant: WD MEDIA, LLC, San Jose, CA (US)

(72) Inventors: Koichi Shimokawa, Shinjuku-ku (JP); Katsushi Hamakubo, Shinjuku-ku (JP); Kae Itoh, Shinjuku-ku (JP)

(73) Assignee: WD Media, LLC, San Jose, CA (US)

( * ) Notice: Subject to any disclaimer, the term of this patent is extended or adjusted under 35 U.S.C. 154(b) by 44 days.

(21) Appl. No.: 14/930,229

(22) Filed: Nov. 2, 2015

(65) Prior Publication Data

US 2016/0055874 A1 Feb. 25, 2016

Related U.S. Application Data

(62) Division of application No. 13/121,901, filed as application No. PCT/JP2009/067022 on Sep. 30, 2009, now Pat. No. 9,177,586.

(30) Foreign Application Priority Data

Sep. 30, 2008 (JP) ................................. 2008-254128
Sep. 30, 2008 (JP) ................................. 2008-254130
Oct. 4, 2008 (JP) ................................. 2008-259136

(51) Int. Cl.
*G11B 5/725* (2006.01)
*G11B 5/86* (2006.01)
(Continued)

(52) U.S. Cl.
CPC ........... *G11B 5/725* (2013.01); *C10M 107/38* (2013.01); *C10M 171/02* (2013.01);
(Continued)

(58) Field of Classification Search
CPC ............ C10M 107/38; C10M 2213/00; C10M 2213/04; C10M 2213/043; C10M 2213/06;
(Continued)

(56) References Cited

U.S. PATENT DOCUMENTS 4,960,609 A * 10/1990 Homola ................. G11B 5/725
427/130
5,025,093 A * 6/1991 Lagow ................... C08G 65/32
562/851
(Continued)

FOREIGN PATENT DOCUMENTS

JP 62-066417 3/1987
JP 02-010518 1/1990
(Continued)

OTHER PUBLICATIONS

Kunz, Roderick R. "Transparent Fluids for 157-nm Immersion Lithography." Journal of Micro/Nanolithography, MEMS, and MOEMS 3.1 (2004): 73-83.*
(Continued)

*Primary Examiner* — Holly Rickman
*Assistant Examiner* — Lisa Chau
(74) *Attorney, Agent, or Firm* — Foley & Lardner LLP

(57) ABSTRACT

A magnetic disk of is provided, the magnetic disk having at least a magnetic layer, a carbon protective layer, and a lubrication layer sequentially provided on a substrate. In an embodiment, the lubrication layer a film formed by a lubricant having a perfluoropolyether compound A having a perfluoropolyether main chain in the structure and also having a hydroxyl group at the end and a compound C obtained from a reaction between a compound B expressed
(Continued)

by: [Chemical formula 1] $CF_3(-O-C_2F_4)m-(O-CF_2)n-OCF_3$ [m and n in the formula are natural numbers.] and aluminum oxide.

11 Claims, 1 Drawing Sheet

(51) Int. Cl.
| | | |
|---|---|---|
| C10M 107/38 | (2006.01) | |
| C10M 171/02 | (2006.01) | |
| C10M 177/00 | (2006.01) | |
| G11B 5/84 | (2006.01) | |
| G11B 5/82 | (2006.01) | |

(52) U.S. Cl.
CPC .............. *C10M 177/00* (2013.01); *G11B 5/82* (2013.01); *G11B 5/8408* (2013.01); *G11B 5/86* (2013.01); *C10M 2213/003* (2013.01); *C10M 2213/0606* (2013.01); *C10N 2220/021* (2013.01); *C10N 2230/06* (2013.01); *C10N 2240/204* (2013.01); *C10N 2250/14* (2013.01); *C10N 2280/00* (2013.01)

(58) Field of Classification Search
CPC ........... C10M 2213/0606; G11B 5/725; C10N 2040/18; C10N 2240/204; C08G 65/007; C08G 2650/48; C09D 171/00; Y10T 428/1164
See application file for complete search history.

(56) References Cited

U.S. PATENT DOCUMENTS

| | | |
|---|---|---|
| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |
| 6,143,375 A | 11/2000 | Ross et al. |
| 6,145,849 A | 11/2000 | Bae et al. |
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gomicki et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |

(56) References Cited

U.S. PATENT DOCUMENTS

| | | |
|---|---|---|
| 7,632,087 B2 | 12/2009 | Homola |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 9,177,586 B2 | 11/2015 | Shimokawa et al. |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2005/0282045 A1* | 12/2005 | Sonoda ............ G11B 5/725 428/843.5 |
| 2006/0016723 A1* | 1/2006 | Tang ............ C10G 25/003 208/14 |
| 2006/0052262 A1* | 3/2006 | Akada ............ C08G 65/007 508/556 |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0245909 A1 | 10/2007 | Homola |
| 2008/0075845 A1 | 3/2008 | Sonobe et al. |
| 2008/0093760 A1 | 4/2008 | Harper et al. |
| 2009/0117408 A1 | 5/2009 | Umezawa et al. |
| 2009/0136784 A1 | 5/2009 | Suzuki et al. |
| 2009/0169922 A1 | 7/2009 | Ishiyama |

(56) References Cited

U.S. PATENT DOCUMENTS

| | | |
|---|---|---|
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Gregory et al. |
| 2014/0234666 A1 | 8/2014 | Knigge et al. |

FOREIGN PATENT DOCUMENTS

| | | |
|---|---|---|
| JP | 04-168621 | 6/1992 |
| JP | 08063739 A * | 3/1996 |
| JP | 2001-052327 | 2/2001 |
| JP | 2001-052328 | 2/2001 |
| JP | 2001-229524 | 8/2001 |
| JP | 2003-288715 | 10/2003 |

OTHER PUBLICATIONS

Notice of Allowance dated Jul. 7, 2015 from U.S. Appl. No. 13/121,901, 12 pages.

Office Action dated Jan. 2, 2015 from U.S. Appl. No. 13/121,901, 10 pages.

Advisory Action dated Apr. 23, 2014 from U.S. Appl. No. 13/121,901, 3 pages.

Office Action dated Feb. 14, 2014 from U.S. Appl. No. 13/121,901, 10 pages.

Office Action dated Jul. 30, 2013 from U.S. Appl. No. 13/121,901, 7 pages.

* cited by examiner

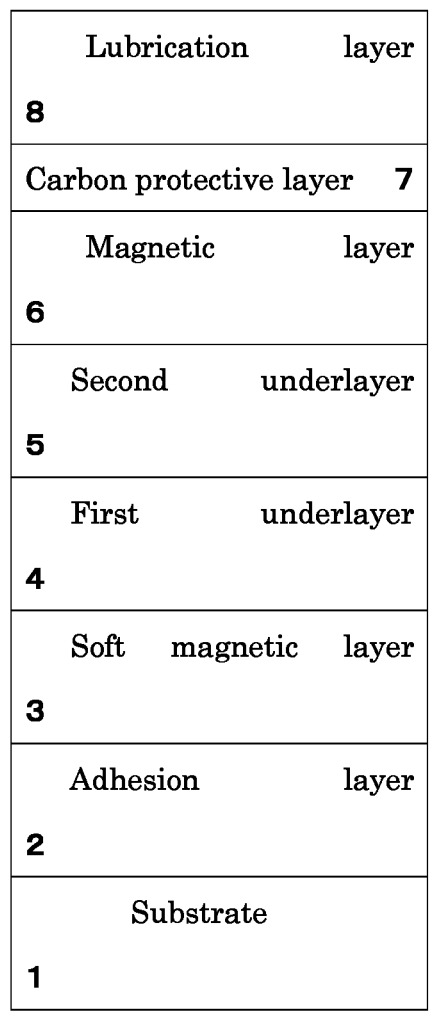

MAGNETIC DISK AND MANUFACTURING METHOD THEREOF

CROSS REFERENCE TO RELATED APPLICATIONS

This application is a divisional of Ser. No. 13/121,901, filed Jun. 20, 2011, which is a National Stage of International Application No. PCT/JP2009/067022 filed Sep. 30, 2009 claiming benefit of Japanese priority Application No. JP2008-254128 filed on Sep. 30, 2008, and of Japanese priority Application No. JP2008-254130 filed on Sep. 30, 2008, and of Japanese priority Application No. JP2008-259136 filed on Oct. 4, 2008, the contents of all of which (including chemical formulas) are incorporated herein by reference in their entirety.

TECHNICAL FIELD

The present invention relates to a magnetic disk mounted on a magnetic disk device such as a hard disk drive (hereinafter referred to as HDD).

BACKGROUND ART

With the recent trend to higher-capacity information processing, various information recording technologies have been developed. Particularly, a surface recording density of an HDD using the magnetic recording technology has been continuously increased by a rate of approximately 100% a year. In recent years, an information recording capacity exceeding 250 GB per disk is required for a magnetic disk having a radius of 2.5 inch used in HDD or the like, and in order to meet such demand, realization of an information recording density exceeding 400 Gbits per 1 square inch is in demand. In order to achieve the high recording density in a magnetic disk used in an HDD or the like, magnetic crystal grains constituting a magnetic recording layer handling recording of an information signal need to be refined, and its layer thickness needs to be reduced at the same time. However, in the case of a magnetic disk of an in-plane magnetic recording method (also referred to as longitudinal magnetic recording method or horizontal magnetic recording method) having been merchandized, as the result of development of the refining of the magnetic crystal grains, thermal stability of the recording signal is damaged by a superparamagnetic phenomenon, and the recording signal is lost. A thermal fluctuation phenomenon begins to occur, which makes an obstructive factor to higher recording density of a magnetic disk.

In order to solve this obstructive factor, a magnetic recording medium of a perpendicular magnetic recording method has been proposed recently. In the case of the perpendicular magnetic recording system, different from the in-plane magnetic recording method, a magnetization easy axis of a magnetic recording layer is adjusted to be oriented in the perpendicular direction with respect to a substrate surface. As compared with the in-plane recording method, the perpendicular magnetic recording method can suppress the thermal fluctuation phenomenon, which is suitable for higher recording density. This type of perpendicular magnetic recording mediums include a so-called two-layer type perpendicular magnetic recording disk provided with a soft magnetic underlayer made of a soft magnetic body on a substrate and a perpendicular magnetic recording layer made of a hard magnetic body.

In a prior-art magnetic disk, a protective layer and a lubrication layer are provided on the magnetic recording layer formed on a substrate in order to ensure durability and reliability of the magnetic disk. Particularly, the lubrication layer used on the outermost surface requires various characteristics such as long-term stability, chemical substance resistance, friction resistance, heat resistant properties and the like.

In response to such request, a perfluoropolyether lubricant having a hydroxyl group in a molecule has been widely used as a lubricant for magnetic disk. For example, as in Japanese Patent Laid-Open No. S62-66417 (Patent Document 1), a magnetic recording medium on which a perfluoroalkylpolyether lubricant having a structure of $HOCH_2CF_2O(C_2F_4O)_p(CF_2O)_qCH_2OH$ having a hydroxyl group at both ends of the molecule is applied is well known. If there is a hydroxyl group in a molecule of a lubricant, it is known that an adhesion characteristic to a protective layer of the lubricant can be obtained by an interaction of the protective layer and the hydroxyl group.

CITATION LIST

Patent Literature

PTL 1: Japanese Unexamined Patent Application Publication No. S62-66417

SUMMARY OF INVENTION

Technical Problem

As described above, the information recording density of 400 Gbits/inch$^2$ or more is required for the recent HDD, but one of the reasons for that is, in addition to the needs for an HDD as a conventional storage device for computer, related to applications by being mounted on a mobile phone, a car-navigation system, a digital camera and the like. In the case of these new applications, a housing space on which the HDD is mounted is extremely smaller than that of a computer, thus the size of the HDD needs to be reduced. For that purpose, a diameter of a magnetic disk to be mounted on the HDD needs to be reduced. In the computer application, for example, a 3.5-inch type or 2.5-inch type magnetic disk can be used, but in the case of the above new applications, a smaller-sized such as a 1.8-inch to 0.8-inch type small-diameter magnetic disk is used, for example. Even if the diameter of the magnetic disk is reduced, a certain level or more of an information capacity needs to be stored, which increasingly promotes improvement of the information recording density.

Also, in order to effectively utilize a limited disk area, an LUL (Load Unload) method HDD has begun to be used instead of the prior-art CSS (Contact Start and Stop) method. In the LUL method, when an HDD is stopped, a magnetic head is retreated onto an inclined base called a ramp located outside the magnetic disk and in a start operation, after the magnetic disk starts rotating, the magnetic head is made to slide from the ramp onto the magnetic disk, floated and flied for recording and reproducing. In a stop operation, the magnetic head is retreated to the ramp outside the magnetic disk and then, the rotation of the magnetic disk is stopped. This series of operations are called LUL operations. In a magnetic disk to be mounted on the LUL-method HDD, a contact sliding region (CSS region) with the magnetic head as in the CSS method does not have to be provided, and thus, a recording and reproducing area can be expanded, which is preferable for a higher information capacity.

In order to improve the information recording density under these circumstances, a spacing loss needs to be reduced as much as possible by reducing a floating amount of the magnetic head. In order to achieve the information recording density of 100 Gbits or more per 1 square inch, the floating amount of the magnetic head needs to be within 10 nm. In the LUL method, unlike the CSS method, a projection and recess shape for the CSS does not have to be provided on the magnetic disk surface, whereby the magnetic disk surface can be extremely smoothened. Thus, in the magnetic disk to be mounted on the LUL method HDD, the magnetic-head floating amount can be further lowered as compared with the CSS method, whereby a higher S/N ratio of the recording signal can be realized, and contribution can be made to a higher recording capacity of a magnetic disk device, which is an advantage.

Due to the further decrease of the magnetic-head floating amount promoted by recent introduction of the LUL method, a stable operation of the magnetic disk even with a low floating amount not more than 10 nm is in demand at present. Particularly, as described above, the magnetic disk has been moving from the in-plane magnetic recording method to the perpendicular magnetic recording method, and a larger capacity of a magnetic disk and a decrease in a flying height with that are in strong demand.

As described above, in recent years, the magnetic disk devices are widely used not only as a storage device of a conventional personal computer but in mobile applications including a mobile phone and a car-navigation system, and due to diversification of the applications, environmental resistances required for the magnetic disk has been extremely severe. Therefore, in terms of these situations, further improvement of durability of the magnetic disk or durability of a lubricant constituting a lubrication layer is imminent.

Also, with the recent rapid improvement of the information recording density of the magnetic disk, reduction of a magnetic spacing between the magnetic head and the recording layers of the magnetic disk is in demand, and a lubrication layer located between the magnetic head and a recording layer of the magnetic disk needs to be further thinned. A lubricant used for the lubrication layer on the outermost surface of the magnetic disk has a large influence on durability of the magnetic disk, but even if it is made into a thin film, stability and reliability are indispensable for the magnetic disk.

As described above, realization of a magnetic disk excellent in long-term stability of a lubrication layer and having a reduced magnetic spacing with the recent higher recording density and high reliability with a decreased floating amount of the magnetic head is in demand, and due to diversification of the applications and the like, environmental resistance required for the magnetic disk has become extremely severe, and thus, further improvement of the characteristics such as durability of a lubricant constituting a lubrication layer largely affecting durability of the magnetic disk and particularly LUL durability and a fixed-point floating characteristic (CFT characteristic) is in demand.

The present invention was made in view of the above conventional situations and has an object to provide a magnetic disk excellent in durability of the magnetic disk or particularly in LUL durability and CFT characteristics and having high reliability under a decreased floating amount of the magnetic head accompanying the recent rapid increase in a recording density and extremely severe environmental resistance accompanying diversification of the applications.

Solution to Problem

The inventors have examined adhesion properties of a lubricant largely affecting durability of a lubricant to a protective layer. In the case of a prior-art lubricant having a hydroxyl group at ends of a molecule, after the lubricant is applied on a disk, chemical binding is generated between the protective film and the hydroxyl group by baking treatment, and the adhesion properties of the lubricant to the protective layer is obtained, but at this time, not all the active points (adsorption points) on the protective film are involved with the binding with the lubricant. If this type of magnetic disk is used by being mounted on a magnetic disk device, the active points on the protective film not involved with the binding with the lubricant gradually suck an organic gas mainly consisting of a Si gas and the like in the atmosphere, and particularly with a low floating amount, organic contamination or the like adsorbed onto the surface of the lubrication layer is highly likely to transfer to a magnetic head and as a result, causes a fly stiction failure due to head contamination.

The inventors have found out that the above problems can be solved by the following invention through keen examination and completed the present invention.

That is, the present invention has the following configuration.

(Composition 1) A magnetic disk having at least a magnetic layer, a protective layer, and a lubrication layer sequentially provided on a substrate, in which the lubrication layer is a film formed by a lubricant that contains two types of compounds having a perfluoropolyether main chain in the structure, a molecular weight distribution of the two types in total being within a range of 1 to 1.2, the two types of compounds including a compound a having a hydroxyl group at the end and a compound b having a number average molecular weight smaller than the number average molecular weight of the compound a and not more than 1500, and a content of the compound b in the two types of compounds being not more than 10%.

(Composition 2) The magnetic disk described in the composition 1, characterized in that the number average molecular weight of the compound a is within a range of 1000 to 10000.

According to the invention according to the composition 1, since the lubricant contains the compound b having a low molecular weight, active points on the protective film not binding with the lubricant compound a having a high molecular weight binds with the compound b having a low molecular weight, and as a result, by means of the decrease in the active points on the protective film not binding with the lubricant, it is possible to suppress adsorption of organic contamination, and a magnetic disk in which occurrence of a fly stiction failure is suppressed, characteristics such as the LUL durability and CFT characteristics of the magnetic disk are more excellent than before, and under the low floating amount of the magnetic head accompanying the recent rapid increase in a recording density, a magnetic disk having high reliability under the extremely severe environmental resistance accompanying diversified applications can be obtained.

Here, as described in the invention according to the composition 2, the number average molecular weight of the lubricant compound a contained in the lubrication layer is particularly preferably within the range of 1000 to 10000.

That is because repairability by appropriate viscosity is provided, favorable lubrication performances are exerted, and excellent heat resistance can be also provided.

(Composition 3) A magnetic disk having at least a magnetic layer, a protective layer, and a lubrication layer sequentially provided on a substrate, characterized in that the lubrication layer contains a compound having a perfluoropolyether main chain in the structure, the molecular weight distribution of the compound is within a range of 1 to 1.2 and the content of the one with the number average molecular weight not more than 1500 is not more than 10%.

(Composition 4) The magnetic disk described in the composition 3, in which the compound is a compound having a hydroxyl group at the end of the molecule.

(Composition 5) The magnetic disk described in the composition 3 or 4, in which the number average molecular weight of the compound contained in the lubrication layer is within a range of 1000 to 10000.

(Composition 6) The magnetic disk described in any one of the compositions 3 to 5, in which the protective layer is a carbon protective layer formed by a plasma CVD method.

(Composition 7) The magnetic disk described in any one of the compositions 3 to 6, in which the magnetic disk is a magnetic disk mounted on a magnetic disk device of a load-unload method.

(Composition 8) A manufacturing method of a magnetic disk having at least a magnetic layer, a protective layer, and a lubrication layer sequentially provided on a substrate, characterized in that the lubrication layer is a film formed by performing molecular distillation of a lubricant containing a perfluoropolyether compound having a perfluoropolyether main chain in the molecule and by forming a film of the lubricant having a molecular weight distribution of the compound within a range of 1 to 1.2 and a content of the one with a number average molecular weight of not more than 1500 is not more than 10% on the protective layer.

(Composition 9) The manufacturing method of a magnetic disk described in the composition 8, characterized in that after the film of the lubrication layer is formed, the magnetic disk is exposed to an atmosphere of 50 to 150° C.

According to the invention according to the composition 3, since the molecular weight distribution of the lubricant compound includes a low-molecular region side and contains the low-molecular-weight lubricant compound, the active points on the protective film that did not bind with the high-molecular-weight lubricant compound binds with the low-molecular-weight lubricant compound, and the active points not binding with the lubricant on the protective film are reduced as a result, whereby adsorption of organic contamination can be suppressed, occurrence of a fly stiction failure can be deterred, and the characteristics such as the LUL durability and the CFT characteristics of the magnetic disk is made more excellent than before, and under the lower floating amount of the magnetic head accompanying the recent rapid increase in a recording density and under the extremely severe environmental resistance accompanying the diversification of applications, a magnetic disk with high reliability can be obtained.

As in the invention according to the composition 4, the compound contained in the lubrication layer is particularly preferably a compound containing a hydroxyl group at the end of the molecule. The hydroxyl group greatly interacts with the protective layer or particularly a carbon protective layer, which improves adhesion properties between the lubrication layer and the protective layer.

Also, as described in the invention according to the composition 5, the number average molecular weight of the compound contained in the lubrication layer is particularly preferably within the range of 1000 to 10000. That is because repairability by appropriate viscosity is provided, favorable lubrication performances are exerted, and excellent heat resistance can be also provided.

Also, as described in the invention according to the composition 6, the protective layer is particularly preferably a carbon protective layer, a film formed by the plasma CVD method. By means of the plasma CVD method, a carbon protective layer, which is a film closely formed having a uniform surface, can be formed, which is preferable for the present invention.

Also, as described in the invention according to the composition 7, the magnetic disk of the present invention is particularly preferable as a magnetic disk mounted on a LUL-method magnetic disk device. A further decrease of the magnetic-head floating amount realized by introduction of the LUL method has required the magnetic disk to operate stably even with a low floating amount of not more than 10 nm, and the magnetic disk of the present invention having high reliability under the low floating amount is preferable.

Also, as described in the invention according to the composition 8, the magnetic disk of the present invention having high reliability under the low floating amount is a manufacturing method of a magnetic disk in which at least a magnetic layer, a protective layer, and a lubrications layer are sequentially provided on a substrate, and the lubrication layer is preferably obtained by the manufacturing method of a magnetic disk formed by performing molecular distillation of a lubricant containing a perfluoropolyether compound having a perfluoropolyether main chain in the molecule and by forming a film of the lubricant having a molecular weight distribution of the compound within a range of 1 to 1.2 and a content of the one with a number average molecular weight of not more than 1500 is not more than 10% on the protective layer.

Also, as described in the invention according to the composition 9, in the manufacturing method of the magnetic disk of the composition 8, after the lubrication layer is formed, by exposing the magnetic disk to the atmosphere at 50 to 150° C., the adhering force of the formed lubrication layer to the protective layer can be further improved.

(Composition 10) A magnetic disk having at least a magnetic layer, a protective layer, and a lubrications layer sequentially provided on a substrate, in which the lubrication layer is a film formed by a lubricant containing a perfluoropolyether compound a having a perfluoropolyether main chain in the structure and a hydroxyl group at the end and a compound b with the number average molecular weight not more than 1500 having a perfluoropolyether main chain in the structure and an aromatic group at both ends of the hydroxyl group and a chain-state molecule.

(Composition 11) The magnetic disk described in the composition 10, characterized in that the number average molecular weight of the compound a contained in the lubrication layer is within a range of 1000 to 10000.

(Composition 12) The magnetic disk described in the composition 10 or 11, characterized in that the protective layer is a carbon protective layer, which is a film formed by the plasma CVD method.

(Composition 13) The magnetic disk described in any one of the composition 10 to 12, characterized in that the magnetic disk is a magnetic disk mounted on a Load-Unload method magnetic disk device.

According to the invention according to the composition 10, since the lubrication layer is a film formed by a lubricant formed containing a perfluoropolyether compound a (hereinafter referred to as lubricant compound a) having a perfluoropolyether main chain in the structure and a hydroxyl group at the end and a compound b with the number average molecular weight not more than 1500 having a perfluoropolyether main chain in the structure and an aromatic group at both ends of the hydroxyl group and a chain-state molecule, the low-molecular-weight compound b having both the hydroxyl group with a strong adsorbing force with the active points on the protective film and the aromatic group that can interact with the active points on a relatively wide range enters a spatial gap of the high-molecular-weight lubricant compound a and efficiently bind with the active points on the protective film not binding with the high-molecular-weight lubricant compound a so as to reduce the active points on the protective film not binding with either of the lubricant compound a or compound b as a result, whereby adsorption of organic contamination can be suppressed, and a magnetic disk, in which occurrence of a fly stiction failure is suppressed, can be obtained which is more excellent in the characteristics such as the LUL durability and CFT characteristics of the magnetic disk than before and has high reliability under the low floating amount of the magnetic head accompanying the recent rapid increase in a recording density and moreover under the extremely severe environmental resistance accompanying the diversification of applications.

Also, as in the invention according to the composition 11, the number average molecular weight of the compound a contained in the lubrication layer is particularly preferably within a range of 1000 to 10000. That is because repairability by appropriate viscosity is provided, favorable lubrication performances are exerted, and excellent heat resistance can be also provided.

Also, as in the invention according to the composition 12, the protective layer is particularly preferably a carbon protective layer, a film formed by the plasma CVD method. By means of the plasma CVD method, a carbon protective layer, which is a film closely formed having a uniform surface, can be formed, which is preferable for the present invention.

Also, as described in the invention according to the composition 13, the magnetic disk of the present invention is particularly preferable as a magnetic disk mounted on a LUL-method magnetic disk device. A further decrease of the magnetic-head floating amount realized by introduction of the LUL method has required the magnetic disk to operate stably even with a low floating amount of not more than 10 nm, and the magnetic disk of the present invention having high reliability under the low floating amount is preferable.

(Composition 14) A magnetic disk in which at least a magnetic layer, a protective layer, and a lubrication layer are sequentially provided on a substrate, in which the lubrication layer is a film formed by a lubricant having a perfluoropolyether compound a having a perfluoropolyether main chain in the structure and also having a hydroxyl group at the end and a compound c obtained from a reaction between a compound b expressed by:
[Chemical formula 1]

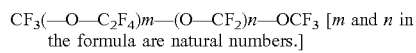

$CF_3(-O-C_2F_4)m-(O-CF_2)n-OCF_3$ [$m$ and $n$ in the formula are natural numbers.]

and aluminum oxide.

(Composition 15) The magnetic disk described in the composition 14, characterized in that the number average molecular weight of the compound a contained in the lubrication layer is within a range of 1000 to 10000.

(Composition 16) The magnetic disk described in the composition 14 or 15, characterized in that the protective layer is a carbon protective layer, which is a film formed by the plasma CVD method.

(Composition 17) The magnetic disk described in any one of the composition 14 to 16, characterized in that the magnetic disk is a magnetic disk mounted on an Load-Unload method magnetic disk device.

According to the invention according to the composition 14, since the lubrication layer is a film formed by a lubricant having a perfluoropolyether compound a (hereinafter referred to as a lubricant compound a) having a perfluoropolyether main chain in the structure and also having a hydroxyl group at the end and a low-molecular-weight compound c obtained from the reaction between a compound b and aluminum oxide, the low-molecular-weight compound c enters a spatial gap of the high-molecular-weight lubricant compound a and binds with the active points on the protective film not binding with the high-molecular-weight lubricant compound a so as to reduce the active points on the protective film not binding either of the lubricant compound a or compound c as a result, whereby adsorption of organic contamination can be suppressed, occurrence of a fly stiction failure is suppressed, and a magnetic disk can be obtained which is more excellent in the characteristics such as the LUL durability and CFT characteristics of the magnetic disk than before and has high reliability under the low floating amount of the magnetic head accompanying the recent rapid increase in a recording density and moreover under the extremely severe environmental resistance accompanying the diversification of applications.

Also, as in the invention according to the composition 15, the number average molecular weight of the compound a contained in the lubrication layer is particularly preferably within a range of 1000 to 10000. That is because repairability by appropriate viscosity is provided, favorable lubrication performances are exerted, and excellent heat resistance can be also provided.

Also, as in the invention according to the composition 16, the protective layer is particularly preferably a carbon protective layer, a film formed by the plasma CVD method. By means of the plasma CVD method, a carbon protective layer, which is a film closely formed having a uniform surface, can be formed, which is preferable for the present invention.

Also, as described in the invention according to the composition 17, the magnetic disk of the present invention is particularly preferable as a magnetic disk mounted on a LUL-method magnetic disk device. A further decrease of the magnetic-head floating amount realized by introduction of the LUL method has required the magnetic disk to operate stably even with a low floating amount of not more than 10 nm, and the magnetic disk of the present invention having high reliability under the low floating amount is preferable.

Advantageous Effects of Invention

According to the present invention, a magnetic disk excellent in the durability of the magnetic disk or particularly in the LUL durability and CFT characteristics and having high reliability (a stable operation can be guaranteed) under the low floating amount of the magnetic head accompanying the recent rapid increase in a recording density and moreover under the extremely severe environmental resistance accompanying the diversification of applications.

BRIEF DESCRIPTION OF DRAWINGS

FIG. 1 is a schematic sectional view of an embodiment of a magnetic disk of the present invention.

DESCRIPTION OF EMBODIMENTS

The present invention will be described below in detail.

The magnetic disk of the present invention is a magnetic disk, as in the composition 1, having at least a magnetic layer, a protective layer, and a lubrication layer sequentially provided on a substrate, in which the lubrication layer is a film formed by a lubricant containing two types of compounds having a perfluoropolyether main chain in the structure, a molecular weight distribution of the two types in total is within a range of 1 to 1.2, the two types of compounds including a compound a having a hydroxyl group at the end and a compound b having a number average molecular weight smaller than the number average molecular weight of the compound a and not more than 1500, and a content of the compound b in the two types of compounds being not more than 10%.

According to the above invention, since the lubricant contains the compound b having a low molecular weight, active points on the protective film not binding with the lubricant compound a having a high molecular weight binds with the compound b having a low molecular weight, and as a result, by means of the decrease in the active points on the protective film not binding with the lubricant, it is possible to suppress adsorption of organic contamination, and a magnetic disk in which occurrence of a fly stiction failure is suppressed, characteristics such as the LUL durability and CFT characteristics of the magnetic disk are more excellent than before, and under the low floating amount of the magnetic head accompanying the recent rapid increase in a recording density, and having high reliability under the extremely severe environmental resistance accompanying diversified applications can be obtained.

Here, the number average molecular weight of the lubricant compound a contained in the lubrication layer is particularly preferably within the range of 1000 to 10000. That is because repairability by appropriate viscosity is provided, favorable lubrication performances are exerted, and excellent heat resistance can be also provided.

In order to have the advantages of the present invention exerted favorably, a difference in the molecular weight between the lubricant compound a having a high molecular weight and the compound b having a lower molecular weight is preferably within a range of approximately 500 to 2000 in a number average molecular weight.

As the present invention, the following embodiment is preferable.

Subsequently, embodiments of the present invention will be described in more detail.

First Embodiment

A magnetic disk according to a first embodiment of the present invention is a magnetic disk having at least a magnetic layer, a protective layer, and a lubrication layer sequentially provided on a substrate, in which the lubrication layer contains a compound having a perfluoropolyether main chain in the structure, a molecular weight distribution of the compound is within a range of 1 to 1.2, and a content of the one with a number average molecular weight not more than 1500 is not more than 10%.

The lubricant compound contained in the lubrication layer in the magnetic disk of the present invention is a compound having a perfluoropolyether main chain in the structure and a compound (hereinafter referred to as a lubricant compounds (I) according to the present invention) expressed by the following chemical formula, for example:

[Chemical Formula 2]

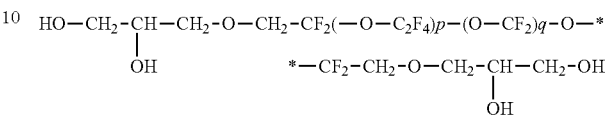

[p and q in the formula are natural numbers.]

or a compound (hereinafter referred to as a lubricant compounds (II) according to the present invention) expressed by the following chemical formula:

[Chemical formula 3]

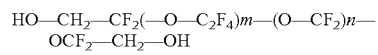

[m and n in the formula are natural numbers.]

Also, in addition to the above, a compound (hereinafter referred to as a lubricant compounds (III) according to the present invention) having a perfluoropolyether main chain in the structure and perfluoropolyether groups having a hydroxyl group at the end binding with each other via a linking group having at least a hydroxyl group in the structure is preferably named.

The lubricant compound (I) according to the present invention contained in the lubrication layer in the magnetic disk of the present invention is a perfluoropolyether compound having a perfluoropolyether main chain in the structure and having four hydroxyl groups at the end. Also, the lubricant compound (II) according to the present invention is a perfluoropolyether compound having a perfluoropolyether main chain in the structure and having two hydroxyl groups at the end. As these perfluoropolyether lubricants, commercial products including Fomblin Z-TETRAOL (product name) and Fomblin Z DOL (product name) by SOLVAY SOLEXIS, Inc., for example, can be used.

Also, the lubricant compound (III) according to the present invention is a compound having a perfluoropolyether main chain in the structure and perfluoropolyether groups having a hydroxyl group at the end binding with each other via a linking group having at least a hydroxyl group in the structure, and it is only necessary that the linking group has at least a hydroxyl group in the structure and has a group expressed as —$(CR_1R_2)$—, for example. Here, $R_1$ and $R_2$ are hydrogen atoms or hydroxyl groups, respectively.

The above perfluoropolyether group has a perfluoropolyether main chain expressed as —$(O-C_2F_4)m-(O-CF_2)n$- (m and n are both integers not less than 1) in the structure and also having a hydroxyl group at the end, for example, and as such perfluoropolyether group, a group expressed by the following formula (I) is preferably named:

Formula (I)

[Chemical formula 4]

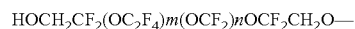

In the formula, m and n are both integers not less than 1.

As a manufacturing method of the lubricant compound (III) according to the present invention, a manufacturing method of reacting 2 equivalent weight or 3 equivalent weight to the perfluoropolyether compound having a perfluoropolyether main chain in a molecule and having a hydroxyl group at the end with 1 equivalent weight of an aliphatic compound having the structure that can react with the perfluoropolyether compound and generate a hydroxyl group, for example, is preferably cited. As the aliphatic compound, for example, a diepoxy compound having an epoxido structure at the end is preferably named. By using such compound, the lubricant compound (III) according to the present invention can be obtained with high purity and high yield. Specific examples of such diepoxy compounds are named below but they do not limit the present invention.

[Chemical Formula 5]

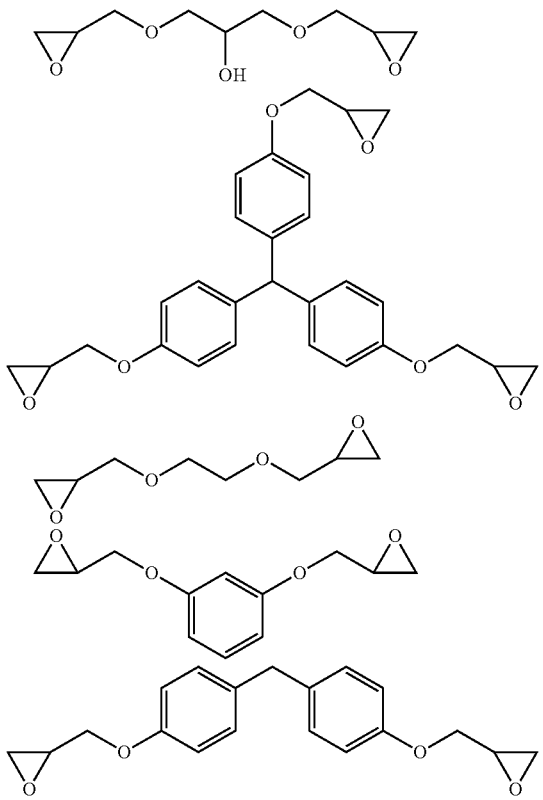

Also, as the above perfluoropolyether compound, a perfluorodiol compound having a hydroxyl group at the molecule end and expressed by the following formula (II) is cited:

Formula (II)
[Chemical formula 6]

HOCH$_2$CF$_2$(OC$_2$F$_4$)$m$(OCF$_2$)$n$OCF$_2$CH$_2$OH

In the formula, m and n are both integers not less than 1.

That is, under a base condition, by having a perfluoropolyether compound having a hydroxyl group at the end work on the base so as to have alkoxide, and this alkoxide develops a nucleophillic open-chain reaction with an aliphatic compound having an epoxide structure at the end and then, a 2 equivalent amount or 3 equivalent amount compound in which the perfluoropolyether compounds bind with each other through a linking group changed from the above aliphatic compound is obtained.

Examples of the lubricant compound (III) according to the present invention are cited below, but the present invention is not limited by these compounds:

[Chemical formula 7]

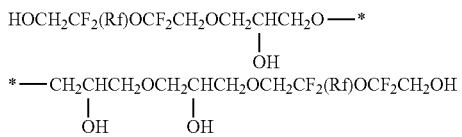

Rf: —(OC$_2$F$_4$)m(OCF$_2$)n- (m, n=integer not less than 1)

In the present invention, as the lubricant constituting the lubrication layer, the lubricant compounds (I), (II), and (III) according to the present invention may be used singularly or they may be mixed as appropriate and used. Combinations when being used in a mixture is arbitrary.

In the present invention, by performing molecular weight fractionation with an appropriate method, molecular weight distribution (weight average molecular weight (Mw)/number average molecular weight (Mn) ratio) of the lubricant compounds contained in the lubrication layer within a range of 1 to 1.2 and also a content of a compound having the number average molecular weight not more than 1500 is not more than 10%. Particularly preferably, molecular weight distribution within a range of 1 to 1.2 and also a compound having the number average molecular weight within a range of 800 to 1500 is contained in a range of 5 to 10%.

The lubricant compound contained in the lubrication layer of the present invention contains, in short, two types of compounds, that is, a compound with a high molecular weight having a perfluoropolyether main chain in the structure and a compound with a low molecular weight, and the molecular weight distribution of the two types of the compounds in total is within the range of 1 to 1.2. The two types of the compounds include a compound a with a high molecular weight preferably having a hydroxyl group at an end and a compound b with a molecular weight lower than the compound a, that is, with a number average molecular weight smaller than the compound a and not more than 1500. And a content of the compound b in these two types of the compounds is not more than 10%.

Regarding conventional lubricants, molecular weight fractionation is carried out such that the molecular weight distribution becomes as narrow as possible and the low-molecular region side is removed, but if a lubrication layer is formed by using such lubricant, many of the active points on the protective film not involved in binding with the lubricant remain, which causes occurrence of a fly stiction failure due to adsorption of organic contamination.

On the other hand, in the present invention, since the molecular weight distribution of the lubricant compound includes a low-molecular region side and contains the lubricant compound with a low molecular weight, the active points on the protective film not binding with the lubricant compound with a high molecular weight bind with the lubricant compound with a low molecular weight, and the active points on the protective film not binding with the lubricant are decreased as a result, and thus, adsorption of organic contamination can be suppressed, and occurrence of a fly stiction failure is suppressed. As a result, under a decreased floating amount of the magnetic head accompanying the recent rapid increase in a recording density, and moreover under an extremely severe environmental resistance accompanying the diversified applications, a magnetic disk having high reliability can be obtained.

In the present invention, there is no need to limit a method of carrying out molecular weight fractionation, but molecular weight fractionation using a gel permeation chromatography (GPC) method or molecular weight fractionation using a supercritical extraction method can be used, for example.

The molecular weight of the lubricant according to the present invention is not particularly limited, but the number average molecular weight (Mn) is preferably within a range of 1000 to 10000, for example, or more preferably within a range of 1000 to 6000. That is because repairability by appropriate viscosity is provided, and favorable lubrication performances can be exerted.

Since the lubricant compound (III) according to the present invention is made of a compound in which perfluoropolyether compounds bind with each other through a linking group, a compound with a high molecular weight of 2 equivalent or 3 equivalent to perfluoropolyether is obtained, and since a decrease in the molecular weight by thermal decomposition can be suppressed, a magnetic disk using such lubricant can have its heat resistance improved. With a further decrease (10 nm or less) in the floating amount of the magnetic head accompanying the recent increase in a recording density, a possibility of frequent contact and friction between the magnetic head and the magnetic disk surface is getting high. Also, in the case of the contact with the magnetic head, it is likely that the magnetic head does not depart from the magnetic disk surface immediately but remains in friction and sliding. Also, due to recording and reproducing by the recent high-speed rotation of the magnetic disk, more heat is generated than before by contact and friction. Therefore, a possibility of thermal decomposition of a lubricant layer material on the magnetic disk surface becomes higher than before due to the generation of heat as above, and adhesion of the thermally-decomposed lubricant with lowered molecular weight and increased fluidity to the magnetic head, reading/writing of data might be hindered. Moreover, considering data recording and reproducing in a near future in a state in which the magnetic head is in contact with the magnetic disk, an influence of heat generated by contact all the time is further concerned. In view of these circumstances, further improvement on heat resistance required for the lubrication layer is in demand, and the lubricant compound (III) is particularly favorable.

In forming a film of the lubrication layer using the lubricant according to the present invention, the film can be formed by applying by a dip method, for example, using a solution in which the lubricant is dispersed and dissolved in an appropriate solvent. As the solvent, a fluorine solvent (Vertrel XF by DU PONT-MITSUI FLUOROCHEMICALS COMPANY, LTD. or the like), for example, can be favorably used. The film forming method of the lubrication layer is naturally not limited to the above dip method but a film forming method such as a spin coating method, a spraying method, a paper coating method and the like may be used.

In the present invention, in order to further improve an adhesion force of the formed lubrication layer to the protective layer, the magnetic disk may be exposed to the atmosphere at 50 to 150° C. after the film formation.

In the present invention, the film thickness of the lubrication layer is preferably 5 to 20 Å. If it is less than 5 Å, lubrication performances as the lubrication layer might be lowered. The thickness exceeding 20 Å is not preferable from the viewpoint of film thinning.

Second Embodiment

A magnetic disk according to a second embodiment of the present invention is a magnetic disk having at least a magnetic layer, a protective layer, and a lubrication layer sequentially provided on a substrate, in which the lubrication layer is constituted by forming a film of a lubricant containing a lubricant compound a and a compound b having a perfluoropolyether main chain in the structure, a hydroxyl group and an aromatic group at both ends of a chain-state molecule, and a number average molecular weight not more than 1500.

The lubricant compound a contained in the lubrication layer in the magnetic disk of the present invention is a perfluoropolyether compound having a perfluoropolyether main chain in the structure and a hydroxyl group at the end, and a compound expressed by the following chemical formula, for example, is favorably cited:

[Chemical Formula 8]

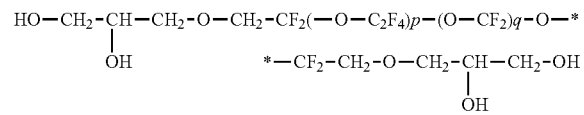

[p and q in the formula are natural numbers.]

The above exemplary compound of the lubricant compound a contained in the lubrication layer in the magnetic disk of the present invention is a perfluoropolyether compound having a perfluoropolyether main chain in the structure and having four hydroxyl groups at the end. Also, as the lubricant compound a according to the present invention, a perfluoropolyether compound having a perfluoropolyether main chain in the structure and having two hydroxyl groups at the end can be also used. As these perfluoropolyether lubricants, commercial products including Fomblin Z-TETRAOL (product name) and Fomblin Z DOL (product name) by SOLVAY SOLEXIS, Inc., for example, can be used.

Also, the compound b contained in the lubricant for forming the lubrication layer in the present invention is a compound having a perfluoropolyether main chain in the structure and also having a hydroxyl group and an aromatic group at the both ends of a chain-state molecule and with the number average molecular weight of not more than 1500.

As the aromatic group in this case, a phenyl group, for example, can be cited as a typical example, but a naphthylene group, a biphenyl group, a phthalimidyl group, an aniline group and the like can be also cited. The aromatic group may have an appropriate substituent group.

The compound b contained in the lubrication layer together with the lubricant compound a as above is a compound having an aromatic group such as a phenyl group at both ends of a chain-state molecule having a perfluoropolyether main chain in the structure, for example, and in order that the working effects by the present invention is exerted further favorably, it is preferably a compound having a hydroxyl group other than the aromatic group in the structure. The compound is particularly preferably a compound having both the aromatic group and the hydroxyl group at the both ends of the chain-state molecule having a perfluoropolyether main chain in the structure.

The exemplary compounds of the compound b according to the present invention are cited below, but the present invention is not limited by these compounds:

[Chemical formula 9]
Exemplary compound

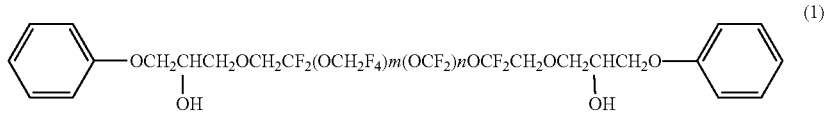
(1)

(m, n=integer not less than 1)

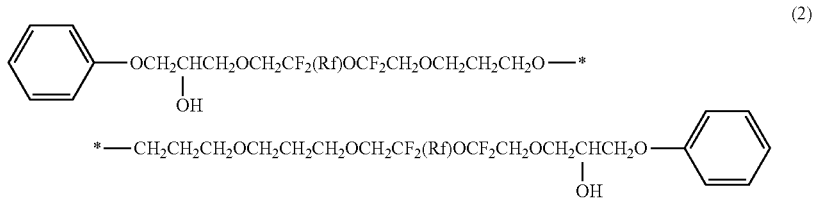
(2)

Rf: —(OCH$_2$F$_4$)$m$(OCF$_2$)$n$—

(m, n=integer not less than 1)

[Chemical formula 10]

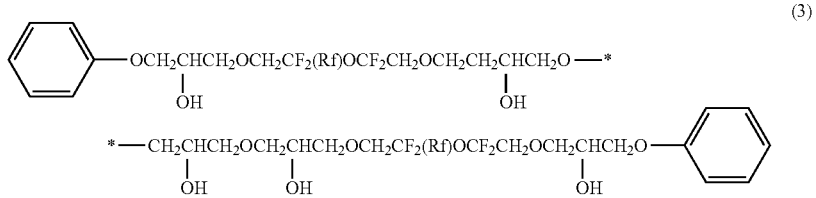
(3)

Rf: —(OCH$_2$F$_4$)$m$(OCF$_2$)$n$—

(m, n=integer not less than 1)

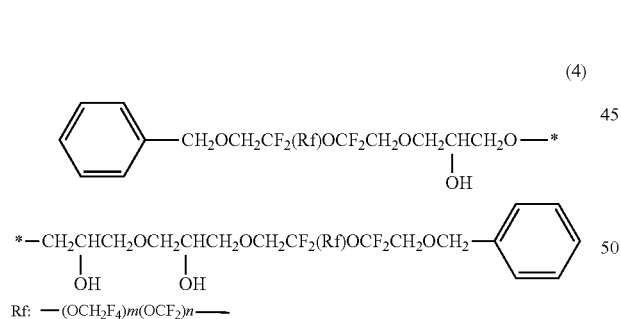
(4)

Rf: —(OCH$_2$F$_4$)$m$(OCF$_2$)$n$—

(m, n=integer not less than 1)

[Chemical formula 11]

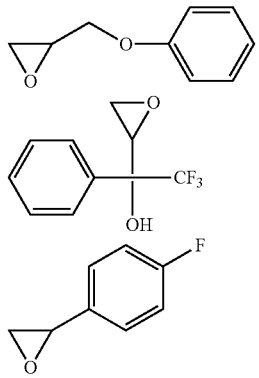

As the manufacturing method of the compound b according to the present invention, a manufacturing method in which 2 equivalent weight of a compound (glycidyl phenyl ether, for example) having an epoxy group and an aromatic group, for example, is made to react with the perfluoropolyether compound having a perfluoropolyether main chain in the molecule, for example, is favorably cited.

The above compound having an epoxy group and an aromatic group is not particularly limited, and the following compounds and the like can be cited, for example.

Regarding the molecular weight of the compound b according to the present invention, the number molecular weight (Mn) thereof is preferably within a range not more than 1500, for example, or more preferably within a range of 500 to 1500 in order that the working effects of the present invention is favorably exerted.

In the present invention, as the lubricant that forms a lubrication layer, the above lubricant compound a and the above compound b are mixed in use. A mixing ratio when being used in a mixture is preferably such that a weight ratio of the lubricant compound a/compound b is within a range of approximately 8:2 to 9:1. If the rate of the lubricant compound a in the lubricant is smaller than the above range, favorable lubrication performances might not be obtained. Also, if the rate of the compound b in the lubricant is smaller than the above range, the working effect that the compound b with a low molecular weight efficiently binds with the active points on the protective film not binding with the lubricant compound a with a high molecular weight and as a result, the decrease in the active points on the protective film not binding with either of the lubricant compound a or the compound b suppresses adsorption of organic contamination cannot be fully obtained.

The molecular weight of the lubricant compound a according to the present invention is not particularly limited, but the number average molecular weight (Mn) is preferably within a range of 1000 to 10000, for example, or more preferably within a range of 1000 to 6000. That is because repairability by appropriate viscosity is provided, and favorable lubrication performances are exerted.

A method of molecular weight fractionation is not particularly limited, and molecular weight fractionation using a gel permeation chromatography (GPC) method or molecular weight fractionation using a supercritical extraction method can be used, for example.

According to this embodiment, the lubricant compound contained in the lubrication layer preferably contains, in short, two types of compounds, that is, a compound with a high molecular weight having a perfluoropolyether main chain in the structure and a compound with a low molecular weight, and these two types of compounds are preferably the compound a with a high molecular weight having a hydroxyl group at the end and the compound b with a molecular weight lower than the compound a, that is, with a number average molecular weight smaller than the compound a and of not more than 1500. In this embodiment, the molecular weight distribution of the two types of the compounds in total is preferably within the range of 1 to 1.2. And the content of the compound b in these two types of the compounds is particularly preferably not more than 10%.

A method of forming a film of the lubrication layer using the above lubricant in this embodiment is similar to the first embodiment described above.

Also, the film thickness of the lubrication layer is also preferably 5 to 20 Å similarly to the first embodiment.

Third Embodiment

A magnetic disk according to a third embodiment of the present invention is a magnetic disk in which at least a magnetic layer, a protective layer, and a lubrication layer are sequentially provided on a substrate and the lubrication layer is characterized in that a film of a lubricant is formed containing a lubricant compound a and a compound c obtained by reaction between a compound b expressed by the following chemical formula:

[Chemical formula 12]

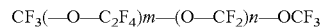
$CF_3(\!-\!O\!-\!C_2F_4)m\!-\!(O\!-\!CF_2)n\!-\!OCF_3$ [m and n in the formula are natural numbers.]

and aluminum oxide.

The lubricant compound a contained in the lubrication layer in the magnetic disk of this embodiment is a perfluoropolyether compound having a perfluoropolyether main chain in the structure and also having a hydroxyl group at the end, and a compound expressed as the following chemical formula:

[Chemical Formula 13]

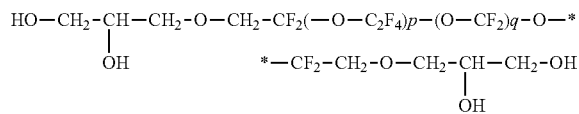
HO—CH$_2$-CH—CH$_2$-O—CH$_2$-CF$_2$(—O—C$_2$F$_4$)p—(O—CF$_2$)q—O—*
      |
      OH                          *—CF$_2$-CH$_2$-O—CH$_2$-CH—CH$_2$-OH
                                                          |
                                                          OH

[p and q in the formula are natural numbers.] is favorably cited.

The above exemplary compound of the lubricant compound a contained in the lubrication layer in the magnetic disk of the present invention is a perfluoropolyether compound having a perfluoropolyether main chain in the structure and also having four hydroxyl groups at the end. Also, as the lubricant compound a according to the present invention, a perfluoropolyether compound having a perfluoropolyether main chain in the structure and having two hydroxyl groups at the end can be also used. As these perfluoropolyether lubricants, commercial products including Fomblin Z-TETRAOL (product name) and Fomblin Z DOL (product name) by SOLVAY SOLEXIS, Inc., for example, can be used.

Also, the compound c contained in the lubricant in order to form the lubrication layer in the present invention is obtained by reaction between the compound b expressed by the following chemical formula:

[Chemical formula 14]

$CF_3(\!-\!O\!-\!C_2F_4)m\!-\!(O\!-\!CF_2)n\!-\!OCF_3$

[m and n in the formula are natural numbers.] and aluminum oxide. That is, by mixing the above compound b (with the weight average molecular weight of approximately 3000 to 7000, for example) and aluminum oxide (alumina, Al$_2$O$_3$) with an appropriate mixing ratio and heating them, C—C link of the main chain in the compound b is cut off, and the compound c with a lower molecular weight is obtained. Aluminum oxide is refined and removed.

The molecular weight of the above compound c is not particularly limited as long as it is obtained by reaction between the above compound b and aluminum oxide and has a lower molecular weight, but in order that the working effect of the present invention is favorably exerted, the number average molecular weight (Mn) is preferably within a range of not more than 1500, for example, or more preferably within a range of 500 to 1500.

In the present invention, as the lubricant that forms a lubrication layer, the above lubricant compound a and the above compound c are mixed in use. A mixing ratio when being used in a mixture is preferably such that a weight ratio of the lubricant compound a/compound c is within a range of approximately 8:2 to 9:1. If the rate of the lubricant compound a in the lubricant is smaller than the above range, favorable lubrication performances might not be obtained. Also, if the rate of the compound c in the lubricant is smaller than the above range, the working that the compound c with a low molecular weight binds with the active points on the protective film not binding with the lubricant compound a with a high molecular weight and as a result, the decrease in the active points on the protective film not binding with either of the lubricant compound a or the compound c suppresses adsorption of organic contamination effect cannot be fully obtained.

The molecular weight of the lubricant compound a according to the present invention is not particularly limited, but the number average molecular weight (Mn) is preferably within a range of 1000 to 10000, for example, or more preferably within a range of 1000 to 6000. That is because repairability by appropriate viscosity is provided, and favorable lubrication performances are exerted.

Also, the above compound b can be obtained from commercial products. The molecular weight is not particularly limited, but if a commercial product is used, by appropriate molecular weight fractionation, those having the weight average molecular weight of approximately 3000 to 7000, for example, are appropriate.

A method of molecular weight fractionation is not particularly limited, and molecular weight fractionation using a gel permeation chromatography (GPC) method or molecular weight fractionation using a supercritical extraction method can be used, for example.

According to this embodiment, the lubricant compound contained in the lubrication layer contains, in short, two types of compounds, that is, a compound with a high molecular weight having a perfluoropolyether main chain in the structure and a compound with a low molecular weight, and these two types of compounds are the compound a with a high molecular weight having a hydroxyl group at the end and the compound c with a molecular weight lower than the compound a, that is, with a number average molecular weight smaller than the compound a and preferably of not more than 1500. In this embodiment, the molecular weight distribution of the two types of the compounds in total is preferably within the range of 1 to 1.2. And the content of the compound c in these two types of the compounds is particularly preferably not more than 10%.

A method of forming a film of the lubrication layer using the above lubricant in this embodiment is similar to the first embodiment described above.

Also, the film thickness of the lubrication layer is also preferably 5 to 20 Å similarly to the first embodiment.

Also, in the above-described first to third embodiments, as the protective layer, a carbon protective layer can be favorably used. Particularly, an amorphous carbon protective layer is preferable. By using the carbon protective layer as the protective layer, an interaction between a polar group (particularly a hydroxyl group) of the lubricant according to the present invention and the protective layer is further increased, and the working effect by the present invention is further exerted, which is a preferable mode.

In the carbon protective layer in the present invention, it is preferable that nitrogen is contained in the lubrication layer side of the protective layer so as to have a composition graded layer in which hydrogen is contained in the magnetic layer side, for example.

If the carbon protective layer is used in the present invention, a film can be formed by using a DC magnetron sputtering method, for example, but an amorphous carbon protective layer formed by the plasma CVD method is particularly preferable. By forming a film by the plasma CVD method, the surface of the protective layer is made uniform and closely formed. Therefore, to form a lubrication layer according to the present invention on the protective layer formed by using the CVD method with smaller coarseness is preferable.

In the present invention, the film thickness of the protective layer is preferably 20 to 70 Å. If the thickness is less than 20 Å, performances as the protective layer might be lowered. The thickness exceeding 70 Å is not preferable from the viewpoint of film thinning.

In the magnetic disk of the present invention, the substrate is preferably a glass substrate. A glass substrate is rigid and is excellent in smoothness, which is preferable for higher recording density. As the glass substrate, an aluminosilicate glass substrate, for example, can be cited, and particularly a chemically-reinforced aluminosilicate glass substrate is preferable.

In the present invention, regarding coarseness of the main surface of the above substrate, the surface is supersmooth with Rmax preferably at 6 nm or less and Ra preferably at 0.6 nm or less. The surface coarseness Rmax and Ra here are based on the specification by JIS B0601.

The magnetic disk of the present invention is provided at least with a magnetic layer, a protective layer, and a lubrication layer on the substrate, but in the present invention, the magnetic layer is not particularly limited and may be either an in-plane recording type magnetic layer or a perpendicular recording type magnetic layer, but the perpendicular recording type magnetic layer is particularly preferable for realization of the recent rapid increase in recording density. Particularly, a CoPt magnetic layer is preferable since it can obtain both a high magnetic coercive force and a high reproduction output.

In the magnetic disk of the present invention, an underlayer can be provided between the substrate and the magnetic layer as necessary. Also, an adhesion layer or a soft magnetic layer or the like may be provided between the underlayer and the substrate. In this case, as the underlayer, a Cr layer, a Ta layer, a Ru layer or an alloy layer of CrMo, CoW, CrW, CrV, CrTi and the like can be cited, and as the adhesion layer, an alloy layer of CrTi, NiAl, AlRu and the like can be cited, for example. Also, as the soft magnetic layer, a CoZrTa alloy layer film, for example, can be cited.

As a perpendicular magnetic recording disk suitable for higher recording density, a configuration provided with an adhesion layer, a soft magnetic layer, an underlayer, a magnetic layer (perpendicular magnetic recording layer), a carbon protective layer, and a lubrication layer on a substrate is preferable. In this case, an auxiliary recording layer may be preferably provided on the perpendicular magnetic recording layer through an exchange-coupling control layer.

The magnetic disk of the present invention is preferable as a magnetic disk mounted particularly on a LUL-method magnetic disk device. A further decrease of the magnetic-head floating amount realized by introduction of the LUL method has required the magnetic disk to operate stably even with a low floating amount of not more than 10 nm, and the magnetic disk of the present invention having high reliability under the low floating amount is preferable.

EXAMPLES

The present invention will be described below in more detail by referring to examples.

The following example 1 and example 2 are examples corresponding to the above-described first embodiment.

Example 1

FIG. 1 is a magnetic disk 10 according to an embodiment of the present invention.

The magnetic disk 10 has an adhesion layer 2, a soft magnetic layer 3, a first underlayer 4, a second underlayer 5, a magnetic layer 6, a carbon protective layer 7, and a lubrication layer 8 sequentially formed on the substrate 1.
(Manufacture of Lubricant)

By making 2 equivalent weight of the perfluorodiol compound expressed by the above formula (II) react with 1 equivalent weight of the exemplified diepoxy compound under a base condition, the exemplified compound of the lubricant compound (III) of the present invention was manufactured. Specifically, the above both compounds were stirred in acetone, sodium hydroxide was added and the mixture was further refluxed. Conditions such as a reaction temperature, time and the like were set as appropriate.

The lubricant made of the compound obtained as above was subjected to molecular weight fractionation by the supercritical extraction method and prepared so that the number average molecular weight measured by the NMR method is 3000, the molecular weight distribution (weight average molecular weight (Mw)/number average molecular weight (Mn) ratio) is within a range of 1 to 1.2, and a content of the compound with the number average molecular weight of not more than 1500 is not more than 10%.

(Manufacture of Magnetic Disk)

A 2.5-inch glass disk (outer diameter of 65 mm, inner diameter of 20 mm, and disk thickness of 0.635 mm) made of chemically reinforced aluminosilicate glass was prepared and used as a disk substrate 1. The main surface of the disk substrate 1 was mirror-polished so as to have R max of 2.13 nm and Ra of 0.20 nm.

On this disk substrate 1, a Ti adhesion layer 2, a Fe soft magnetic layer 3, a NiW first underlayer 4, a Ru second underlayer 5, and a CoCrPt magnetic layer 6 were formed sequentially in an Ar gas atmosphere by the DC magnetron sputtering method. This magnetic layer was a perpendicular magnetic recording type magnetic layer.

Subsequently, a film of a diamond-like carbon protective layer 7 was formed with the film thickness of 50 Å by the plasma CVD method.

Subsequently, a lubrication layer 8 was formed as follows.

A solution in which the lubricant made of the lubricant (the above exemplary compound) of the present invention manufactured as above and subjected to molecular weight fractionation by the supercritical extraction method was dispersed and dissolved with concentration of 0.2 weight % in Vertrel XF (product name) by DU PONT-MITSUI FLUOROCHEMICALS COMPANY, LTD., which is a fluorine solvent was, prepared. By using this solution as an application liquid, the magnetic disk on which films were formed up to the protective layer 7 was immersed and the liquid was applied by the dip method, and a film of the lubrication layer 8 was formed.

After the film formation, the magnetic disk was subjected to heating treatment in a vacuum firing furnace at 130° C. for 90 minutes. The film thickness of the lubrication layer 8 was measured by a Fourier transform infrared spectrophotometer (FTIR), and the result was 12 Å. A magnetic disk 10 of Example 1 was obtained as above.

Subsequently, the magnetic disk of Example 1 was evaluated using the following test methods.

(Evaluation of Magnetic Disk)

(1) First, a CFT characteristic evaluation test (fixed-position floating test) was conducted.

The magnetic disk obtained as above was left in a Si gas atmosphere in advance for 24 hours before the test was conducted. A fixed position was set on the disk inner peripheral side (disk-radius 15 mm position). In order to conduct the CFT test in an extreme environment, the test was conducted in an environment with a temperature at 70° C. and relative humidity of 80%.

As a result, the magnetic disk of Example 1 was found to endure fixed-point continuous floating for successive four weeks and found to be extremely excellent in the CFT characteristics even under an extreme condition. Also, the surfaces of the magnetic head and the magnetic disk after the CFT test were examined in detail by an optical microscope and an electronic microscope, but no scar or corrosion phenomenon was observed.

(2) Subsequently, in order to evaluate LUL (Load-Unload) durability of the magnetic disk, a LUL durability test was conducted.

An LUL-type HDD (5400-rpm rotation type) was prepared, and a magnetic head with a floating amount of 5 nm and a magnetic disk of the example were mounted. A slider of the magnetic head was a NPAB (negative pressure) slider, and on a reproducing element, a magnetoresistance effect type element (GMR element) was mounted. An FeNi permalloy alloy was used as a shield portion. By making this LUL-type HDD repeat a continuous LUL operation, the number of LUL times the magnetic disk endured until a failure occurred was measured.

As a result, the magnetic disk of Example 1 endured 700 thousand times of the LUL operation without a failure under the super-low floating amount of 5 nm, and no fly stiction failure occurred. Under a usual HDD use environment, it is said to take approximately 10 years for the magnetic disk to exceed the number of the LUL times of 400 thousands, and endurance of 600 thousand is considered as favorable at the present, and thus, the magnetic disk of Example 1 can be considered to have extremely high reliability.

The surface of the magnetic disk after the LUL durability test was examined in detail by an optical microscope and an electronic microscope, but no abnormality such as a scar or a stain was observed and the surface was favorable. Also, the surface of the magnetic head after the LUL durability test was examined in detail by an optical microscope and an electronic microscope, but no abnormality such as a scar or a stain was observed or no adhesion of the lubricant to the magnetic head or a corrosion failure was observed and the surface was favorable.

Example 2

As the lubricant, Fomblin Z-TETRAOL (product name) by SOLVAY SOLEXIS, Inc., which is a perfluoropolyether lubricant, was subjected to molecular weight fractionation by the GPC method, a compound prepared such that the number average molecular weight measured by the NMR method is 3000, the molecular weight distribution (weight average molecular weight (Mw)/number average molecular weight (Mn) ratio) is within a range of 1 to 1.2, and a content of the compound with the number average molecular weight of not more than 1500 is not more than 10% was used. The magnetic disk manufactured similarly to Example 1 except this point was used as Example 2.

Subsequently, similarly to Example 1, the magnetic disk was exposed to the Si gas atmosphere and the CFT characteristic evaluation test was conducted, and as a result, the magnetic disk endured the fixed-point continuous floating for successive four weeks, and it was found out that the magnetic disk was extremely excellent in the CFT characteristics even under the extreme conditions. Also, the surfaces of the magnetic head and the magnetic disk after the CFT test were examined in detail by an optical microscope and an electronic microscope, but no scar or corrosion phenomenon was observed.

Also, the LUL durability test was conducted similarly to Example 1, and as a result, the magnetic disk of Example 2 endured 700 thousand times of the LUL operation without a failure under the super-low floating amount of 5 nm, and no fly stiction failure occurred. The magnetic disk of Example 2 can be considered to have extremely high reliability.

The surface of the magnetic disk after the LUL durability test was examined in detail by an optical microscope and an electronic microscope, but no abnormality such as a scar or a stain was observed and the surface was favorable. Also, the surface of the magnetic head after the LUL durability test was examined in detail by an optical microscope and an electronic microscope, but no abnormality such as a scar or a stain was observed or no adhesion of the lubricant to the magnetic head or a corrosion failure was observed and the surface was favorable.

Comparative Example

As the lubricant, Fomblin Z-TETRAOL (product name) by SOLVAY SOLEXIS, Inc., which is a perfluoropolyether lubricant, was subjected to molecular weight fractionation by the GPC method, a compound with Mw of 3000 and a molecular-weight dispersion degree of 1.08 was used. The low molecular weight region side was removed by this molecular weight fractionation, and those having the number average molecular weight of not more than 1500 were not contained. A solution obtained by dispersing and dissolving this in Vertrel XF (product name) by DU PONT-MITSUI FLUOROCHEMICALS COMPANY, LTD., which is a fluorine solvent, was used as an application liquid, a magnetic disk on which films were formed up to the protective layer is immersed, and the liquid was applied by the dip method so as to form a lubricant layer. Here, concentration of the application liquid was adjusted as appropriate, and the film was formed so that the lubrication layer film thickness was within a range of 10 to 12 Å. The magnetic disk manufactured similarly to Example 1 other than the above was used as a comparative example.

Subsequently, similarly to Example, the magnetic disk was exposed to the Si gas atmosphere and the CFT characteristic evaluation test was conducted, and as a result, the magnetic disk failed in less than successive four weeks. This was considered to be caused by active points remaining on the surface of the protective layer not binding with the lubricant, which adsorbed the organic gas in the atmosphere and became head contamination.

Also, similarly to the example, as the result of the LUL durability test under the super-low floating amount of 5 nm, a fly stiction failure occurred in the middle in the magnetic disk of this Comparative Example and failed by head crush at 300 thousand times. The surface of the magnetic disk after the LUL durability test was examined in detail by an optical microscope and an electronic microscope, and a number of scars and the like were observed. Also, the surface of the magnetic head after the LUL durability test was examined in detail by an optical microscope and an electronic microscope, and adhesion of the lubricant to the magnetic head and corrosion failures were observed.

The following Example 3 is an example corresponding to the above-described second embodiment.

Example 3

(Preparation of Lubricant)

As a lubricant containing the lubricant compound a, Fomblin Z-TETRAOL (product name) by SOLVAY SOLEXIS, Inc., which is a commercial perfluoropolyether lubricant, was subjected to molecular weight fractionation by the GPC method, a compound with Mw of 3000 and a molecular-weight dispersion degree of 1.08 was used.

Also, the above exemplary compound (2) of the compound b was manufactured as follows.

A base in 2 equivalent amounts was reacted with a perfluoropolyether compound having a perfluoropolyether main chain in a molecule and then, glycidyl phenyl ether in 2 equivalent amounts was reacted for manufacture. The compound b obtained as above was subjected to molecular weight fractionation as appropriate by the supercritical extraction method and the compound with Mn of not more than 1500 was used.

And the lubricant compound a and the compound b obtained as above were mixed at a weight ratio of 9:1, and a lubricant used in this example was prepared.

(Manufacture of Magnetic Disk)

A 2.5-inch glass disk (outer diameter of 65 mm, inner diameter of 20 mm, and disk thickness of 0.635 mm) made of chemically reinforced aluminosilicate glass was prepared and used as a disk substrate 1. The main surface of the disk substrate 1 was mirror-polished so as to have R max of 2.13 nm and Ra of 0.20 nm.

On this disk substrate 1, a Ti adhesion layer 2, a Fe soft magnetic layer 3, a NiW first underlayer 4, a Ru second underlayer 5, and a CoCrPt magnetic layer 6 were formed sequentially in an Ar gas atmosphere by the DC magnetron sputtering method. This magnetic layer was a perpendicular magnetic recording type magnetic layer.

Subsequently, a film of a diamond-like carbon protective layer 7 was formed with the film thickness of 50 Å by the plasma CVD method.

Subsequently, a lubrication layer 8 was formed as follows.

A solution in which the lubricant prepared as above was dispersed and dissolved with concentration of 0.2 weight % in Vertrel XF (product name) by DU PONT-MITSUI FLUOROCHEMICALS COMPANY, LTD., which is a fluorine solvent, was prepared. By using this solution as an application liquid, the magnetic disk on which films up to the protective layer 7 were formed was immersed and the liquid was applied by the dip method and a film of the lubrication layer 8 was formed. After the film formation, the magnetic disk was subjected to heating treatment in a vacuum firing furnace at 130° C. for 90 minutes. The film thickness of the lubrication layer 8 was measured by a Fourier transform infrared spectrophotometer (FTIR), and the result was 12 Å. Thus, the magnetic disk of Example 3 was obtained.

Subsequently, the magnetic disk of Example 3 was evaluated by the test method similar to that of Example 1.

First, a CFT characteristic evaluation test (fixed-position floating test) was conducted, and as a result, the magnetic disk of Example 3 was found to be able to endure fixed-point continuous floating for successive four weeks and to be extremely excellent in the CFT characteristics even under an extreme condition. Also, the surfaces of the magnetic head and the magnetic disk after the CFT test were examined in detail by an optical microscope and an electronic microscope, but no scar or corrosion phenomenon was observed.

As the result of the LUL durability test, the magnetic disk of Example 3 endured 800 thousand times of the LUL operation without a failure under the super-low floating amount of 5 nm, and no fly stiction failure occurred. The magnetic disk of Example 3 can be considered to have extremely high reliability. The surface of the magnetic disk after the LUL durability test was examined in detail by an optical microscope and an electronic microscope, but no abnormality such as a scar or a stain was observed and the surface was favorable. Also, the surface of the magnetic head after the LUL durability test was examined in detail by an optical microscope and an electronic microscope, but no abnormality such as a scar or a stain was observed or no adhesion of the lubricant to the magnetic head or a corrosion failure was observed and the surface was favorable.

The following Example 4 is an example corresponding to the above-described third embodiment.

Example 4

(Preparation of Lubricant)

As a lubricant containing the lubricant compound a, Fomblin Z-TETRAOL (product name) by SOLVAY SOLEXIS, Inc., which is a commercial perfluoropolyether lubricant, was subjected to molecular weight fractionation by the GPC method, a compound with Mw of 3000 and a molecular-weight dispersion degree of 1.08 was used.

Also, a commercial product of the above compound b and alumina ($Al_2O_3$) were mixed at an appropriate mixing ratio and heated so as to obtain the compound c. The above-described alumina was removed by refining.

Then, the lubricant compound a and the compound c obtained as above were mixed at a weight ratio of 9:1, and a lubricant used in this example was prepared.

(Manufacture of Magnetic Disk)

A 2.5-inch glass disk (outer diameter of 65 mm, inner diameter of 20 mm, and disk thickness of 0.635 mm) made of chemically reinforced aluminosilicate glass was prepared and used as a disk substrate 1. The main surface of the disk substrate 1 was mirror-polished so as to have R max of 2.13 nm and Ra of 0.20 nm.

On this disk substrate 1, a Ti adhesion layer 2, a Fe soft magnetic layer 3, a NiW first underlayer 4, a Ru second underlayer 5, and a CoCrPt magnetic layer 6 were formed sequentially in an Ar gas atmosphere by the DC magnetron sputtering method. This magnetic layer was a perpendicular magnetic recording type magnetic layer.

Subsequently, a film of a diamond-like carbon protective layer 7 was formed with the film thickness of 50 Å by the plasma CVD method.

Subsequently, a lubrication layer 8 was formed as follows.

A solution in which the lubricant prepared as above was dispersed and dissolved with concentration of 0.2 weight % in Vertrel XF (product name) by DU PONT-MITSUI FLUO-ROCHEMICALS COMPANY, LTD., which is a fluorine solvent was, prepared. By using this solution as an application liquid, the magnetic disk on which films were formed up to the protective layer 7 was immersed and the liquid was applied by the dip method and a film of the lubrication layer 8 was formed.

After the film formation, the magnetic disk was subjected to heating treatment in a vacuum firing furnace at 130° C. for 90 minutes. The film thickness of the lubrication layer 8 was measured by a Fourier transform infrared spectrophotometer (FTIR), and the result was 12 Å. Thus, a magnetic disk of Example 4 was obtained as above.

Subsequently, the magnetic disk of Example 4 was evaluated by the test method similar to that of Example 1.

First, a CFT characteristic evaluation test (fixed-position floating test) was conducted, and as a result, the magnetic disk of Example 4 was found to be able to endure fixed-point continuous floating for successive four weeks and to be extremely excellent in the CFT characteristics even under an extreme condition. Also, the surfaces of the magnetic head and the magnetic disk after the CFT test were examined in detail by an optical microscope and an electronic microscope, but no scar or corrosion phenomenon was observed.

Subsequently, as the result of the LUL durability test, the magnetic disk of Example 4 endured 700 thousand times of the LUL operation without a failure under the super-low floating amount of 5 nm, and no fly stiction failure occurred. The magnetic disk of Example 4 can be considered to have extremely high reliability. The surface of the magnetic disk after the LUL durability test was examined in detail by an optical microscope and an electronic microscope, but no abnormality such as a scar or a stain was observed and the surface was favorable. Also, the surface of the magnetic head after the LUL durability test was examined in detail by an optical microscope and an electronic microscope, but no abnormality such as a scar or a stain was observed or no adhesion of the lubricant to the magnetic head or a corrosion failure was observed and the surface was favorable.

The following Examples 5 and 6 are examples corresponding to the above-described second embodiment.

Example 5

(Preparation of Lubricant)

As a lubricant containing the lubricant compound a, Fomblin Z-TETRAOL (product name) by SOLVAY SOLEXIS, Inc., which is a commercial perfluoropolyether lubricant, was subjected to molecular weight fractionation by the GPC method, a compound with Mw of 2500 and a molecular-weight dispersion degree of 1.08 was used.

Also, the exemplary compound (3) of the compound b was manufactured as follows.

A base in 2 equivalent amounts was reacted with a perfluoropolyether compound having a perfluoropolyether main chain in a molecule and then, glycidyl phenyl ether in 2 equivalent amounts was reacted for manufacture. The compound b obtained as above was subjected to molecular weight fractionation as appropriate by the supercritical extraction method and the compound with Mn of not more than 1500 was used.

And the lubricant compound a and the compound b obtained as above were mixed at a weight ratio of 9:1, and a lubricant used in this example was prepared. The molecular weight distribution of the entire lubricant obtained by mixing the compound a and the compound b as above was within a range of 1 to 1.2.

The magnetic disk manufactured similarly to Example 3 other than the above points was used as Example 5.

Subsequently, similarly to Example 1, as the result of the CFT characteristic evaluation test, the magnetic disk of this Example was found to be able to endure fixed-point continuous floating for successive four weeks and to be extremely excellent in the CFT characteristics even under an extreme condition. Also, the surfaces of the magnetic head and the magnetic disk after the CFT test were examined in detail by an optical microscope and an electronic microscope, but no scar or corrosion phenomenon was observed.

Also, similarly to Example 1, as the result of the LUL durability test, the magnetic disk of Example 5 endured 800 thousand times of the LUL operation without a failure under the super-low floating amount of 5 nm, and no fly stiction failure occurred. The magnetic disk of Example 5 can be considered to have extremely high reliability.

The surface of the magnetic disk after the LUL durability test was examined in detail by an optical microscope and an electronic microscope, but no abnormality such as a scar or a stain was observed and the surface was favorable. Also, the surface of the magnetic head after the LUL durability test was examined in detail by an optical microscope and an electronic microscope, but no abnormality such as a scar or a stain was observed or no adhesion of the lubricant to the magnetic head or a corrosion failure was observed and the surface was favorable.

Example 6

(Preparation of Lubricant)

As a lubricant containing the lubricant compound a, Fomblin Z-TETRAOL (product name) by SOLVAY SOLEXIS, Inc., which is a commercial perfluoropolyether lubricant, was subjected to molecular weight fractionation by the GPC method, a compound with Mw of 3000 and a molecular-weight dispersion degree of 1.08 was used.

Also, the exemplary compound (1) of the compound b was manufactured as follows.

A base in 2 equivalent amounts was reacted with a perfluoropolyether compound having a perfluoropolyether main chain in a molecule and then, glycidyl phenyl ether in 2 equivalent amounts was reacted for manufacture. The compound b obtained as above was subjected to molecular weight fractionation as appropriate by the supercritical extraction method and the compound with Mn of not more than 1500 was used.

And the lubricant compound a and the compound b obtained as above were mixed at a weight ratio of 9:1, and a lubricant used in this example was prepared. The molecular weight distribution of the entire lubricant obtained by mixing the compound a and the compound b as above was within a range of 1 to 1.2.

The magnetic disk manufactured similarly to Example 3 other than the above points was used as Example 6.

Subsequently, similarly to Example 1, as the result of the CFT characteristic evaluation test, the magnetic disk of this Example was found to be able to endure fixed-point continuous floating for successive four weeks and to be extremely excellent in the CFT characteristics even under an extreme condition. Also, the surfaces of the magnetic head and the magnetic disk after the CFT test were examined in detail by an optical microscope and an electronic microscope, but no scar or corrosion phenomenon was observed.

Also, similarly to Example 1, as the result of the LUL durability test, the magnetic disk of Example 6 endured 800 thousand times of the LUL operation without a failure under the super-low floating amount of 5 nm, and no fly stiction failure occurred. The magnetic disk of Example 6 can be considered to have extremely high reliability.

The surface of the magnetic disk after the LUL durability test was examined in detail by an optical microscope and an electronic microscope, but no abnormality such as a scar or a stain was observed and the surface was favorable. Also, the surface of the magnetic head after the LUL durability test was examined in detail by an optical microscope and an electronic microscope, but no abnormality such as a scar or a stain was observed or no adhesion of the lubricant to the magnetic head or a corrosion failure was observed and the surface was favorable.

As described above, in Examples of the present invention, the magnetic disk with high reliability can be obtained which is excellent in the durability of the magnetic disk or particularly excellent in the LUL durability and the CFT characteristics, and under the lower floating amount of the magnetic head accompanying the recent rapid increase in a recording density and under the extremely severe environmental resistance accompanying the diversification of applications.

REFERENCE SIGNS LIST 1 substrate
2 adhesion layer
3 soft magnetic layer
4 first underlayer
5 second underlayer
6 magnetic layer
7 carbon protective layer
8 lubrication layer
10 magnetic disk

The invention claimed is:

1. A magnetic disk comprising a magnetic layer, a protective layer, and a lubrication layer sequentially provided on a substrate, wherein:
    said lubrication layer comprises a lubricant comprising:
        a compound A comprising a perfluoropolyether main chain and a hydroxyl terminal group, wherein the compound A has a number average molecular weight of 1000 to 10,000; and
        a compound C, wherein the compound C is obtained from a reaction between aluminum oxide and a compound B expressed by formula I:

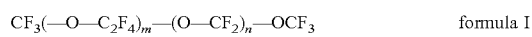

$$CF_3\text{---}(O\text{---}C_2F_4)_m\text{---}(O\text{---}CF_2)_n\text{---}OCF_3 \qquad \text{formula I}$$

wherein m and n are natural numbers not less than 1;
    wherein:
        the aluminum oxide is removed after the reaction, and
        the compound C consists of fragments resulting from a cleavage of a carbon-carbon bond in the compound B and has a number average molecular weight less than compound A and not more than 1500.

2. The magnetic disk according to claim 1, wherein the compound A has a number average molecular weight of 1000 to 6000.

3. The magnetic disk according to claim 1, wherein said protective layer is a carbon protective layer.

4. The magnetic disk according to claim 1, wherein the magnetic disk is a magnetic disk mounted on a Load-Unload method magnetic disk device.

5. The magnetic disk according to claim 1, wherein said compound A and said compound C have a weight ratio of 8:2 to 9:1.

6. The magnetic disk according to claim 1, wherein said compound B has a molecular weight of 3000 to 7000.

7. The magnetic disk according to claim 1, wherein the lubrication layer has a film thickness of 5 to 20 Å.

8. The magnetic disk according to claim 1, wherein the protective layer has a film thickness of 20 to 70 Å.

9. The magnetic disk according to claim 1, wherein the compound A has two terminal hydroxyl groups.

10. The magnetic disk according to claim 1, wherein the compound A has a chemical formula:

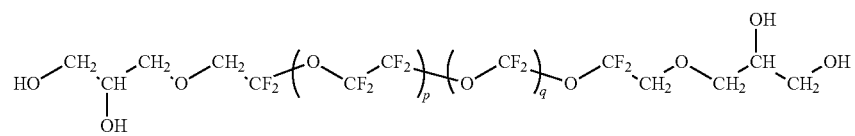
wherein p and q are natural numbers not less than 1.
11. The magnetic disk according to claim 1, wherein the compound C has a number average molecular weight of 500 to 1500.
* * * * *